United States Patent [19]

Beck

[11] E Patent Number: Re. 33,389

[45] Reissued Date of Patent: Oct. 16, 1990

[54] ADJUSTABLE ENDLESS BELT

[76] Inventor: Paul Beck, P.O. Box 2426, Malibu, Calif. 90265

[21] Appl. No.: 300,320

[22] Filed: Jan. 23, 1989

Related U.S. Patent Documents

Reissue of:

[64] Patent No.: 4,637,810
Issued: Jan. 20, 1987
Appl. No.: 588,733
Filed: Mar. 12, 1984

[51] Int. Cl.[5] ..... F16G 3/00

[52] U.S. Cl. ..... 474/253; 474/254

[58] Field of Search ..... 474/253, 254, 256

[56] References Cited

U.S. PATENT DOCUMENTS 4,031,766 6/1977 Beck ..... 474/254
4,437,849 3/1984 Berg ..... 474/256
4,504,257 3/1985 Cennmo ..... 474/256

*Primary Examiner*—Thuy M. Bui
*Attorney, Agent, or Firm*—Lyon & Lyon

[57] ABSTRACT

Disclosed herein is an adjustable endless belt particularly adapted for use in high speed power transmission and commonly termed a fan belt. The belt is comprised of a length of flexible and durable polymeric material, having a central longitudinal channel extending therethrough and a length of flexible and durable cord slightably disposed within the channel and extending the length thereof. The desired belt size is determined by cutting the length of polymeric material with the cord contained therein to the desired length, pulling a portion of the cord from one end of the length polymeric material, applying an adhesive to the exposed cord and the ends of the polymeric material and inserting the exposed cord within the open channel then defined by the other end of the length of polymeric material.

10 Claims, 1 Drawing Sheet

ADJUSTABLE ENDLESS BELT

Matter enclosed in heavy brackets [ ] appears in the original patent but forms no part of this reissue specification; matter printed in italics indicates the additions made by reissue.

BACKGROUND OF THE INVENTION

The endless belts used for moderate load power transmission application in automobiles, which are more commonly collectively termed fan belts, are constructed of a flexible, tear-resistant polymeric material and are manufactured in countless different sizes to accommodate the varying pulley sizes and spacings therebetween found in the vast number of different models of automobiles sold and driven in the United States and foreign countries. While these endless belts are quite durable, they nevertheless are subjected to a great deal of stress due to their high speed operation and consequently must be periodically replaced. Consequently for a garage to be able to meet the needs of its customers, it is necessary to stock a great deal of different sized belts. This presents a substantial inventory problem to the garage as these belts are of a fixed size and consequently a belt suitable for one make of automobile cannot generally be used in another unless the size requirements are the same. Unfortunately, this is not generally the case.

In addition to having to stock a large inventory of these belts, a garage mechanic must often expend a good deal of labor in securing the belt about the pulleys due to the limited flexibility inherent in such belts and the often encountered awkward positioning of the pulleys with respect to the automobile body presenting the mechanic with restricted access for mounting the belt on the pulleys.

The problems of fixed belt size and installation could be greatly relieved if the belt were either adjustable or of a construction whereby it could be readily assembled to the desired size about the pulleys. One solution to the problems of fixed belt size and installation is found in applicant's U.S. Pat. No. 4,031,766 wherein an adjustable belt is provided which can be assembled about the pulleys and thereby facilitate installation while obviating the need for inventory of differently sized belts. That solution employs a belt having a male end of reduced diameter and a female end having a channel therein equal in length to the reduced diameter portion of the male end. To define a belt having the desired size, equal precalculated lengths are severed from both the male and female ends, an adhesive is applied about the male end which is then inserted into the female end of the belt. To avoid any gaps which would otherwise weaken and imbalance the belt, these cuttings have to be carefully made to insure that the length of the reduced diameter portion of the male end is precisely equal to the length of the channel in the female end. The belt of the present invention provides the same ease of installation and adjustability without the need for having to make two such cuts and additionally has superior strength characteristics.

SUMMARY OF THE INVENTION

Briefly, the present invention relates to an endless belt for power transmission which is adjustable in length. The belt is comprised of an outer length of flexible tear-resistant material having reinforcing material extending the length thereof and a channel extending longitudinally therethrough in which is slidably disposed a flexible tear-resistant cord equal in length to the outer length of material. An endless belt is formed by cutting the reinforced outer length of material with the cord disposed therein to the desired belt length, pulling a portion of the cord from one end of the outer length of material, applying a solvent or adhesive to the exposed cord and the ends of the outer length of material and inserting the exposed cord into the then open channel in the other end of the length of material until the ends of the outer length of material are in an abutting relationship and the ends of the cord are in an abutting relationship within the outer length of material.

It is the principal object of the present invention to provide an endless belt for power transmission which is highly durable and size adjustable.

It is another object of the present invention to provide an endless belt for power transmission which is continuous throughout the length thereof.

It is yet another object of the present invention to provide an endless belt for power transmission which is of simple construction and economical to manufacture.

It is still a further object of the present invention to provide an endless belt for power transmission which is free from any external protrusions in the area of the coupling.

It is still another object of the present invention to provide an endless belt for power transmission which is readily adaptable for use in different automobiles having different size requirements.

These and other objects and advantages of the present invention will become apparent from the following detailed description taken in conjunction with the accompanying drawings.

Figure 1:
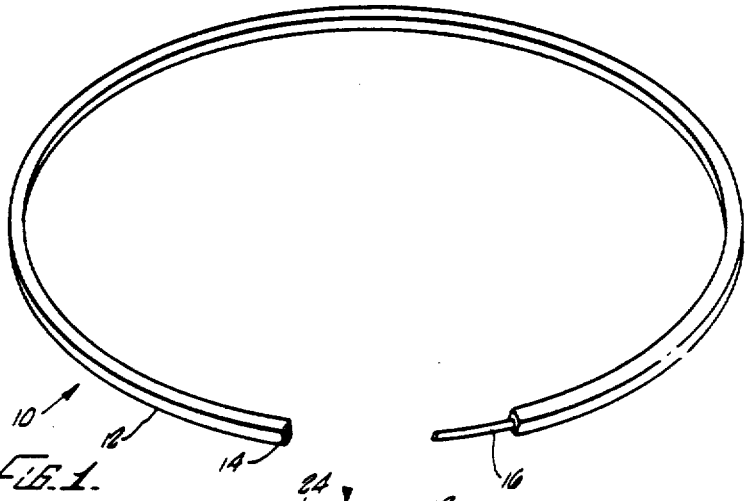
FIG. 1 is a perspective view of the belt prior to assembly.
Figure 2:
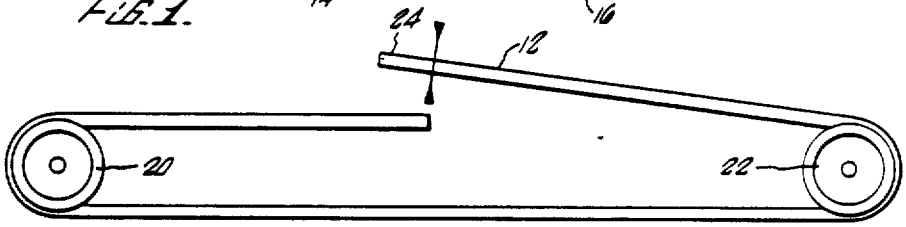
FIG. 2 illustrates the belt being disposed about a pair of pulleys for sizing and cutting.

Referring now in detail to the drawings, the endless belt 10 is comprised of an outer length of flexible tear-resistant material 12, preferably of polymeric construction such as polyurethane or flexible ABS, and has a central longitudinal channel 14 extending therethrough. A cord 16 preferably constructed of the same material as outer length 12 is disposed within channel 14. The length of cord 16 is equal to the outer length of material 12. Cord 16 is preferably provided with a continuous inner reinforcing core or cord 18 constructed of a strong and durable material such as that sold by E. I. DuPont de Nemours & Co., Inc. under the trademark "Kevlar."

Figure 5:
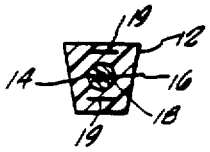
FIG. 5 is a cross-sectional view of the belt.
Figure 6:
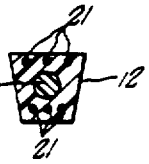
FIG. 6 is a cross-sectional view of another embodiment of the invention.

To provide the preferred embodiment of the belt 10 with additional strength, sheets 19 Kevlar are disposed both above and below channel 14, as seen in FIG. 5. Sheets 19 are preferably, about 0.02 in. in thickness and extend the length of belt 10. FIG. 6 illustrates an alternate embodiment of the belt 10 wherein a plurality of reinforcing cords 21, preferably constructed of Kevlar, are disposed along the length of the belt both above and below channel 14. With the Kevlar reinforcement the belt 10 can withstand on the nature of 600 pounds of pull which is far greater than the force to which fan belts are subjected.

The reinforced length of material 12 is preferably formed by extruding the polyurethane or flexible ABS material and the Kevlar sheets 19 through a cross heads dies to form an integral length of reinforced material. The cord 16 is similarly formed by extrusion through a cross head dies.

Figure 3:
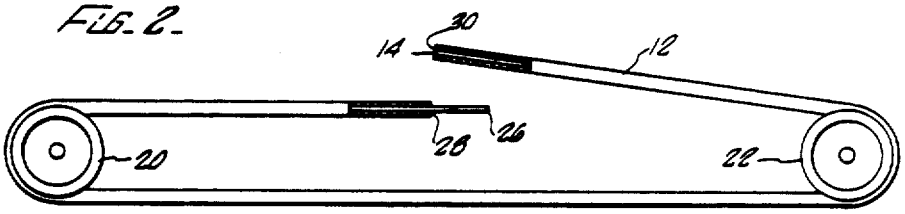
FIG. 3 is a partial cross-sectional view of the belt disposed about a pair of pulleys with a portion of the cord pulled therefrom.
Figure 4:
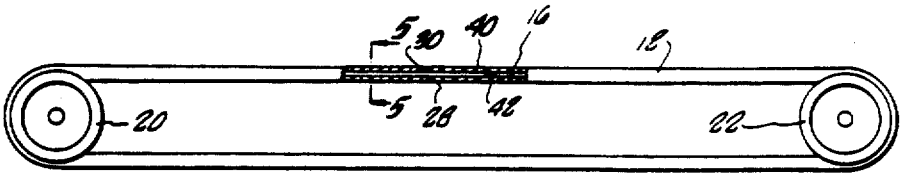
FIG. 4 is a cross-sectional view of the best disposed about a pair of pulleys after assembly.

To form the endless belt 10, the length of reinforced material 12 with cord 16 therein is disposed about the pulleys 20 and 22 about which the belt is to be mounted and the ends thereof are drawn together to the desired tension. The excess length 24 of one end of the belt and cord is then marked and severed therefrom. These steps are illustrated in FIG. 3. An adhesive solvent bonding material is then applied to the exposed portion 26 of the cord 16 and to the ends 28 and 30 of the outer length of material 10. A portion, preferably less than half, of the exposed portion 26 of cord 16 is then pushed back into the end 28 of the outer length of material from which it was pulled. The remaining exposed portion 26 of cord 16 is then inserted into the now open end 30 of channel 14 until the ends 28 and 30 of the outer length of material 12 are in an abutting relationship and the ends 40 and 42 of cord 16 are within an abutting relationship within channel 14 as seen in FIG. 4. Upon the formation of the solvent weld, a continuous endless belt is defined wherein the abutting ends 40 and 42 of said cord are spaced within said outer length of material 12 from the abutting ends 28 and 30 thereof so as to avoid any potential weak spots in the resulting endless belt 10.

It has been found that a solvent bonding material comprised of a blend of cyclohexanone and tetrahydrofuran with about ten percent (10%) or less of the material from which the outer length of material 12 and cord 16 are formed dissolved therein provide an excellent solvent weld.

It is to be understood that while this solvent has been found to be highly suitable for the above construction, other solvents and adhesives, such as epoxy adhesives, having similar holding properties could also be employed. The term adhesive material as used herein shall include all such bonding agents. Other changes and modifications may be made in carrying out the present invention without departing from the spirit and scope thereof. Insofar as these changes and modifications are within the purview of the appended claims they are to be considered as part of the invention.

I claim:

1. A continuously adjustable endless belt for use in power transmission comprising an outer length of flexible tear-resistant material, a cylindrical channel of constant radius extending [logitudinally] *longitudinally* through said outer length of material, [at least one length of reinforcing material disposed in said outer length of material and extending the length thereof,] a cylindrical cord of constant radius constructed of flexible tear-resistant material slidably disposed within said channel, [a length of reinforcing material disposed in said cord and extending the length thereof, the length of said cord being equal to the length of said outer length of flexible material] such that upon pulling a portion of said cord from one end of said outer length of material, applying an adhesive material to said portion of said cord and disposing said portion within said channel in the other end of said outer length of material, a continuous belt of uniform construction is defined.

2. The combination of claim 1 [wherein said] *including at least one length of* reinforcing material in said outer length of material [comprises two strips of Kevlar and said channel is disposed between said strips].

3. A continuously adjustable belt for use in power transmission comprising an outer length of flexible tear-resistant material, a cylindrical channel of constant radius extending longitudinally therethrough, a plurality of lengths of reinforcing material disposed in said outer length of reinforcing material disposed in said outer length of tear-resistant material above and below said channel and extending the length of said material, a cylindrical cord of constant radius constructed of a flexible tear-resistant material slidably disposed within said channel, said cord having a central core of reinforcing material extending the length thereof, said outer length of material and said cord being of equal length such that upon withdrawing a portion of said cord from one end of said outer length of material, an open channel is defined in the other end of said outer length of material equal in length to said portion of said cord and upon applying an adhesive material to said portion of said cord and inserting said portion of said cord within said open channel a continuous endless belt of uniform construction is defined.

4. The endless belt of claim 3 wherein said outer length of tear-resistant material and said cord as constructed of polyurethane or flexible ABS and said core of said cord is constructed of Kevlar.

5. The endless belt of claim 3 wherein said plurality of lengths of reinforcing material disposed in said outer length of tear-resistant material define a pair substantially flat strips of Kevlar of about 0.02 inches in thickness.

6. The endless belt of claim 3 wherein said plurality of lengths of reinforcing material disposed in said outer length of tear-resistant material include an equal number of cords constructed of Kevlar disposed above said channel and below said channel.

7. The process of forming an endless belt of desired length and uniform construction for power transmission comprising the steps of slidably disposing a constant radius [reinforced] tear-resistant cord in a continuous mating relationship within a constant radius cylindrical channel extending longitudinally through an outer belt of flexible tear-resistant material *substantially* equal in length to said cord, withdrawing a portion of said cord from one end of said outer belt, applying an adhesive material to said portion of said cord, and inserting said portion of said cord into said channel in the other end of said outer belt such that the ends of said belt are in an abutting relationship and the ends of said cord are in an [abutting] *adjacent* relationship within said outer belt and spaced from said ends of said belt thereby forming said endless belt of desired length and uniform construction.

8. The process of claim 7 including the step of applying an adhesive to the ends of said outer belt of flexible tear-resistant material.

9. The process of forming an endless belt of desired length and uniform construction for power transmission comprising the steps of slidably disposing a constant radius [reinforced] tear-resistant cord in a continuous mating relationship within a constant radius cylindrical channel extending longitudinally through an outer belt of flexible tear-resistant material *substantially* equal in length to said cord, withdrawing a portion of said cord from one end of said outer belt, applying an adhesive to said portion of said cord, reinserting a portion of said portion of said cord into said one end of said outer belt thereby leaving an exposed portion, and inserting said exposed portion into said channel in the other end of said outer belt such that the ends of said belt are in an abutting relationship and the ends of said [channel are in an abutting relationship] *cords are disposed adjacent each other* within said outer belt spaced from said ends of said belt.

10. The process of claim 9 including the step of applying adhesive to the ends of said outer belt of tear-resistant material.

* * * * *